Patented July 31, 1951

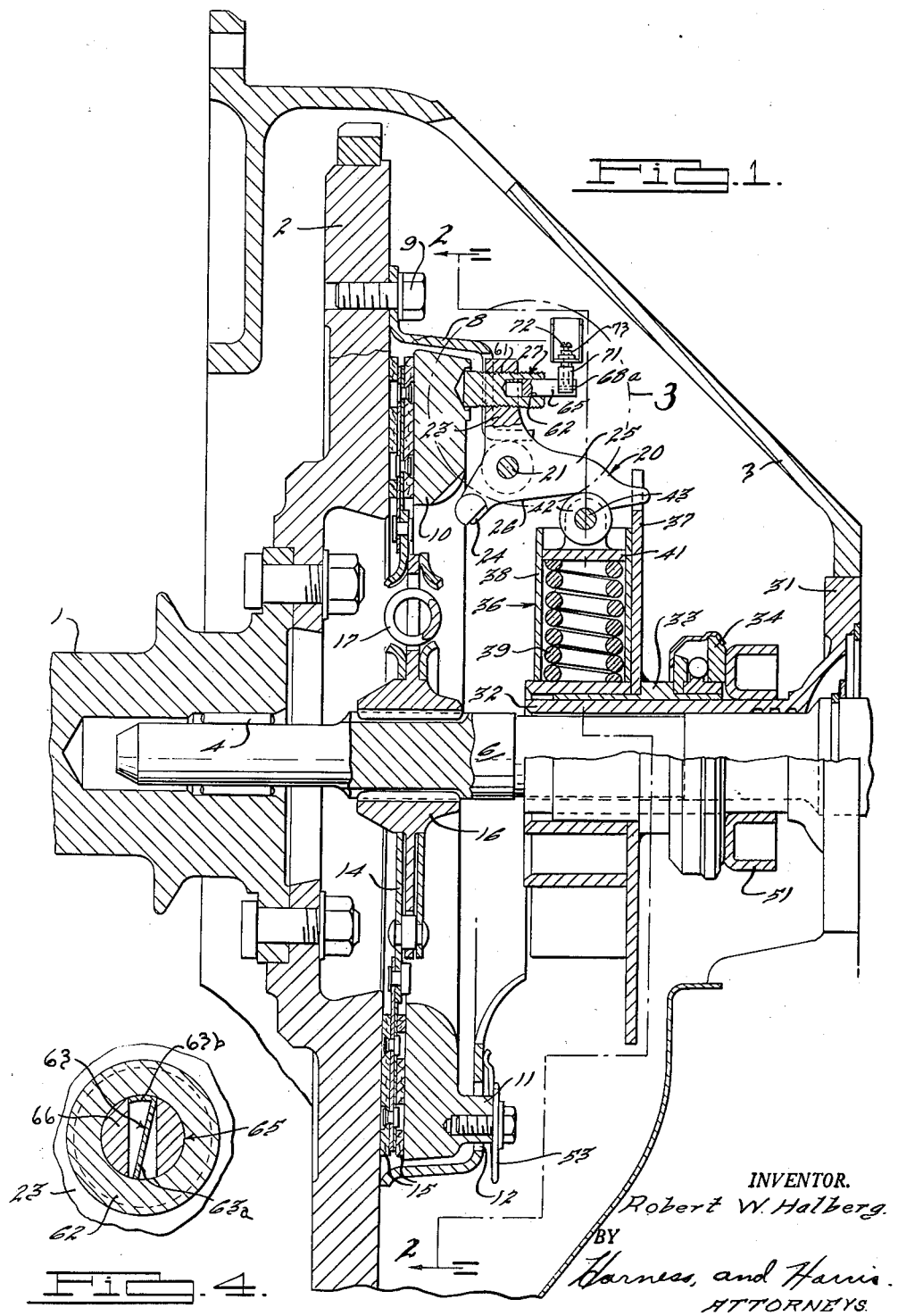

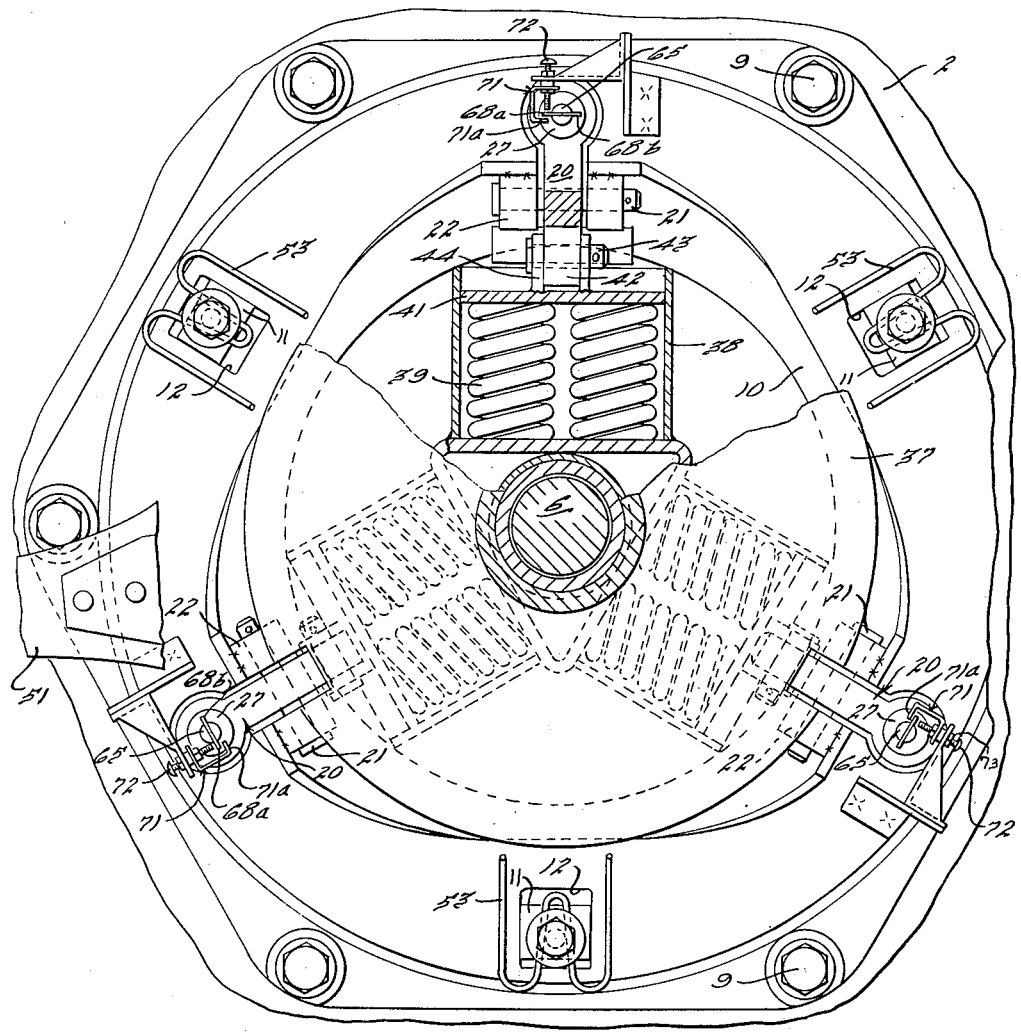
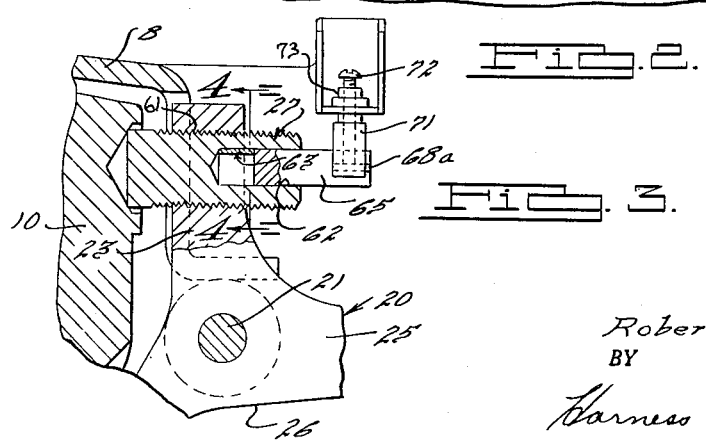

2,562,613

UNITED STATES PATENT OFFICE 2,562,613

OVER-CENTER LEVER ACTUATED CLUTCH

Robert W. Halberg, Chicago, Ill., assignor to Chrysler Corporation, Highland Park, Mich., a corporation of Delaware Application February 13, 1948, Serial No. 8,099

10 Claims. (Cl. 192—99)

This invention relates to a clutch mechanism for effecting the transmission of power between driving and driven members and is more particularly concerned with an improved and simplified form of clutch having an operating mechanism comprising a spring-loaded, over-center, lever actuated device that is characterized by a so-called "light" pedal.

It is an object of this invention to provide a clutch actuating mechanism having a spring-loaded, lever operated, actuating device that so amplifies the applied operating force that only sufficient force to overcome friction need be applied to the operating mechanism in order to actuate the clutch.

It is a further object of this invention to provide a clutch operating mechanism in which an over-center lever mechanism, a spring-loaded cam and roller-follower mechanism, and centrifugal force cooperate to produce an improved type of clutch.

It is a further object of this invention to provide a clutch actuating device having a lever-operated, force multiplying mechanism in combination with an automatic wear take-up device adapted to keep the clutch in perfect adjustment at all times.

It is a further object of this invention to provide an automatic wear take-up device for a friction clutch device, or the like, which is simple in construction, operatively sound and capable of efficient performance.

It is a further object of this invention to provide a lever operated friction clutch construction having an automatic wear take-up device actuated by the clutch levers.

Other objects and advantages of this invention will become apparent from a consideration of the attached specification and the accompanying drawings wherein like reference characters indicate like parts throughout the several views.

Fig. 1 is a sectional side elevational view of a clutch construction embodying the over-center engaging and releasing mechanism and the automatic wear take-up device comprising this invention;

Fig. 2 is a rear elevational view of the clutch housing with portions broken away and in section to clearly disclose the automatic wear take-up device and spring-loaded actuating cylinders;

Fig. 3 is an enlarged sectional side elevational view of the automatic wear take-up device; and Fig. 4 is a sectional view taken along the line 4—4 of Fig. 3 showing the key member construction within the bore of the take-up device adjusting stud.

The crankshaft of an engine is illustrated at 1, having attached thereto a flywheel 2 which is disposed within a clutch housing 3. A clutch driven shaft 6 has one end piloted in the crankshaft as at 4 and the other end of shaft 6 is adapted to be journaled in a suitable supporting structure such as a transmission casing (not shown). The clutch comprises a suitably formed cover plate 8 attached to the flywheel 2 by bolts 9, or the like, and within the cover plate a pressure plate 10 is movably mounted. The pressure plate 10 has lugs 11 which extend through slots 12 in the cover plate 8.

The driven member of the clutch comprises disc member 14 provided with friction facings 15 which are disposed between the driving faces of the flywheel 2 and the pressure plate 10. The driven disc member 14 is fixedly mounted on a hub portion 16 which is drivingly connected to the driven shaft 6. The driven disc 14 is preferably formed with a vibration dampening structure such as that illustrated at 17.

The mechanism for engaging and disengaging the clutch includes a plurality of pivotally mounted levers, each of which is illustrated at 20. The levers 20 are pivotally mounted on the cover plate 8 by means of pivot pins 21, the pin means 21 being carried by cover plate brackets 22. Each lever 20 is formed with three radially extending leg portions 23, 24 and 25 respectively. The diverging leg portions 24 and 25 form a trackway 26. The leg portions 24 and 25 intersect at points beneath or radially inward of the pivot points of the levers. Each leg portion 23 carries a threaded stud member 27 which extends through an opening in the cover plate 8 and has a forward end portion engaging the pressure plate 10.

The rear end of the clutch housing 3 is fitted with a retainer member 31 having a forwardly extending tubular portion 32 adapted to receive the driven shaft 6. Mounted about the tubular portion 32, for axial reciprocatory movement relative thereto, is a sleeve member 33. Sleeve member 33 has a thrust bearing 34 mounted on its rear portion and a clutch operating mechanism 36 mounted on its forward portion.

The clutch operating mechanism 36 comprises a radially extending plate member 37, secured to the sleeve member 33, and mounted thereon are a plurality of radially extending cylinder units 38. Each cylinder unit 38 is adapted to receive a pair of compression springs 39 and a plunger member 41. The plunger member 41 is adapted to reciprocate in the cylinder unit 38, springs 39 urging the plunger member 41 radially outward. Each plunger member 41 carries a roller 42 rotatably mounted on a pin 43 supported by ears 44 on plunger member 41. Roller follower 42 is adapted to ride along the cam trackway 26 on lever 20 as sleeve member 33 reciprocates along tubular portion 32 of the retainer member 31. A fork member 51, pivotally mounted on the clutch housing 3 by means not shown, is provided to actuate the sleeve member 33. The fork 51 is adapted to be operated by a conventional clutch pedal (not shown).

When sleeve member 33 is moved forwardly, roller 42 rolls down the slight incline provided by leg 25 of trackway 26 and this gradually relieves the pressure forcing the pressure plate 10 against the driven disc facings 15. When roller 42 has been moved forwardly beyond the lever pivot pin 21 then it acts upon the portion of lever trackway 26 formed by the leg portion 24 of lever 20 and this positively rocks the lever 20 in a clockwise direction to retract stud 27 and release the clutch engaging pressure. When stud 27 of lever 20 has been retracted away from the pressure plate 10 then the retractor springs 53, carried by the pressure plate lugs 11, retract the pressure plate from engagement with the driven disc facings 15 and the torque transmitting drive train is broken.

To engage the clutch it is merely necessary to release the force holding the actuating fork 51 in disengaged position and the compressed springs 39 will force the rollers 42 rearwardly along the trackways 26. As rollers 42 roll rearwardly along trackways 26 the levers 20 are rotated in a counterclockwise direction and the pressure plate 10 is forced against the clutch disc facings 15 which are then pressed into drive transmitting engagement with the flywheel 2 to thereby establish the torque transmitting drive train.

Several of the obvious advantages of this type of clutch construction are set forth below. Not only does the lever system multiply the effect of the operating force but it will be noted that the slope of the trackway 26, along leg portion 25, is quite small, approximately 5 degrees, accordingly the force required to move the sleeve member 33 forwardly to disengage the clutch is quite small for the disengaging force need only overcome primarily the frictional forces resulting from the roller 42 bearing against the trackway 26. Furthermore, after the roller 42 has been moved forwardly past pivot pin 21 then there is an over-center action which tends to hold the clutch in disengaged position. It will be shown that by this over-center action the force required to hold the clutch disengaged is materially reduced. The above features are quite an improvement over the conventional clutch construction where the force required to compress the pressure springs materially increases as the clutch actuator is moved from engaged to disengaged position. Another advantage of the over-center construction herein disclosed is that the spring-pressed plungers 41 are so located that they produce a centrifugal force effect which tends to hold the clutch in either an engaged or disengaged position. This centrifugal force effect has a tendency to reduce the force required to hold the clutch disengaged and to increase the frictional forces applied to transmit torque when the clutch is in an engaged condition. Another advantage of this construction is the fact that the clutch elements are simplified for it is not necessary to build a cushioning construction in the clutch disc facings. The gradual increase in engaging pressure, resulting from the geometry of the lever actuating means, as the rollers 42 move rearwardly along the slightly inclined trackways 26, provides a cushioning effect that eliminates the need for any other type of cushioning construction in the clutch assembly. This gradual build up in engaging pressure also eliminates grab and chatter in the clutch.

While the compression springs 39 have somewhat of an automatic wear take-up function to compensate for wear of the clutch disc facings 15, still, my construction includes a positive, simplified form of automatic wear take-up device that is particularly adapted for this type of over-center clutch construction but one which can easily be incorporated in other types of friction clutches as well.

The automatic take-up device herein disclosed is similar to one of the forms of adjusting means shown in the Robert W. Halberg co-pending application, Serial No. 9,491, filed February 19, 1948, and includes a threaded bore 61, in the leg portion 23 of each lever 20, each bore being adapted to receive a threaded stud 27. Stud 27 is rocked into and out of engagement with pressure plate 10 as the clutch is engaged and disengaged. The stud 27 has a hollow rear end portion 62 adapted to receive some form of free-wheeling or one-way, torque drive transmitting construction. In the particular form shown this one-way torque drive construction is substantially a ratchet mechanism that will automatically thread the stud 27 through the bore 61 as wear of the clutch disc facings 15 increases the amplitude of swing or rock of the levers 20 during clutch engagement and disengagement. Each ratchet mechanism includes a gripping member such as the L-shaped, bent spring strip 63 which is diametrically disposed in the bore of hollow portion 62 of stud 27. The side leg 63a of member 63 is adapted to pivot about the base leg 63b when a counterclockwise torque is applied to the member 63. This counterclockwise twist of leg 63a disengages the free end edges of legs 63a and 63b from the bore wall and permits rotation of member 63 relative to stud 27. When gripping member 63 is twisted clockwise the free end edges of legs 63a and 63b bite into the bore wall and the stud is twisted clockwise by the gripping member. Consequently, whenever gripping member 63 is twisted in a clockwise direction the stud 27 is rotated clockwise and this clockwise rotation of stud 27 threads it forwardly through the threaded bore 61 in lever leg 23. Whenever gripping member 63 is twisted counterclockwise it rotates in the bore 62 of stud 27 and there is relative rotation between members 63 and 27. The counterclockwise rotation of member 63 relative to stud 27 has no turning effect on the stud 27 and provides a slip or free-wheeling action between these members.

Also mounted in the bore of the hollow portion 62 of each stud 27 is a key member 65 which has a bifurcated forward end portion 66 adapted to receive the gripping member 63. Key member 65 is of such length as to protrude rearwardly from the bore in stud portion 62. The protruding end of key member 65 has wing portions 68a and 68b, one of which is adapted to function as a turning lever for the key member 65.

Cover plate 8 has U-shaped brackets 71 mounted thereon adjacent each lever 20. Each bracket 71 carries an adjusting screw 72 which is provided with a lock nut 73. The threaded end of each screw 72 is adapted to engage the wing 68a of the associated key member 65. Each key member 65 is positioned so that a wing portion 68a thereof is disposed between the threaded end of an adjusting screw 72 and the leg portion 71a of the associated U-shaped bracket 71.

With the take-up assembly shown and described in this application a device is provided that automatically compensates for wear of the clutch disc facings 15 by increasing the effective length of the stud means 27 bearing against the pressure plate 10. As the clutch is engaged and disengaged the levers 20 are rocked about their pivot pins 21. Sufficient clearance is provided between the threaded ends of the screws 72 and the leg portions 71a of the brackets 71 to permit the associated key member wings 68a to oscillate back and forth, during normal operation of the clutch, without wings 68a being forced against either the screws 72 or the bracket legs 71a. If the clutch facings 15 wear then the amplitude of the lever rocking movement is increased and, on engagement of the clutch, the wings 68a will be forced against the ends of screws 72 and the key members 65 will be rotated in a counterclockwise direction. Counterclockwise rotation of key members 65 does not rotate the studs 27 for the gripping members 63 slip in the bores of stud portions 62. This counterclockwise rotation of key members 65, on clutch engagement, after the facings 15 have worn, reduces the length of the uninterrupted swing of the wings 68a on the rearward rocking of the levers 20 as the clutch is disengaged. Due to this reduction in the length of the free swing of the key wings 68a on clutch engagement then on disengagement of the clutch the wings 68a are pressed against the inner side of bracket leg portions 71a and this rotates the key member 65 in a clockwise direction. Rotation of key members 65 in a clockwise direction causes rotation of the studs 27 in a clockwise direction, due to the one-way drive connection between gripping members 63 and the bores in the studs 27. Clockwise rotation of studs 27 threads the studs forwardly through the bores 61 in the lever legs 23 and this forward movement of the studs 27 increases the effective length of the studs and takes up any wear of the clutch facings 15. As long as there is no material wear of the clutch facings 15 then the amplitude of rocking of the levers 20 is substantially constant and the clearance between the screws 72 and the bracket legs 71a is sufficient to prevent rotation of the key members 65 as the levers 20 rock back and forth. As soon as the clutch facings 15 wear then the increased amplitude of swing of the levers 20, on clutch engagement, causes a reduction in length of the uninterrupted swing of the key member wings 68a on clutch disengagement and the key members 65 rotate the studs 27 in a clockwise direction and move them forwardly to take up the wear of the facings 15.

The clutch construction herein disclosed operates efficiently and is economical to manufacture due to its simplicity of form. As a result of the slightly inclined trackways 26 on the levers 20 there is a gradual build-up in load on clutch engagement so the need for the heretofore required clutch plate cushion construction is eliminated. Another feature of the over-center, cam operated, clutch actuating mechanism is that during initial engagement of the clutch the pressure plate is under low engaging pressure and this permits any high spots on the clutch disc facings to slip by without grabbing and this reduces the possibility of clutch chatter. Also, due to the cam and lever force multiplying actuator construction, the force required to disengage the clutch need be only that necessary to overcome the frictional forces acting on the roller-follower mechanism therefore a very easy, light, clutch disengaging action is an inherent feature of this clutch. In addition to providing a construction that requires very little effort to operate the arrangement of the plunger supported roller followers is such as to take advantage of centrifugal force to assist in holding the clutch in engaged and disengaged condition. By reducing the force necessary to disengage the clutch it is also possible to reduce the size of the thrust bearing or bearings associated with the clutch construction and this further reduces the cost of the clutch without sacrificing quality or performance. By incorporating an automatic wear take-up device in the clutch construction the need for periodic adjustments of the clutch has been eliminated and a clutch is provided in which the clearances between the clutch disc facings and the driving plates are maintained substantially constant so that the clutch is always conditioned for maximum performance. The construction herein disclosed permits the use of fewer compression springs than has been standard practice in conventional friction clutches therefore this construction tends to reduce the overall cost of the clutch.

I claim:

1. Actuating mechanism for a friction clutch comprising a flywheel having a cover plate, a driven clutch disc, and a shiftable pressure plate for frictionally engaging said flywheel with said clutch disc, said actuating mechanism comprising lever means oscillatably mounted on said cover plate and provided with means adapted to shift said pressure plate to effect engagement and disengagement of said flywheel and clutch disc, a trackway with diverging leg portions carried by said lever means, a shiftable sleeve member having a spring-pressed, roller adapted to seat on and to be moved along said trackway to actuate said lever means, said lever means trackway being mounted so as to provide an over-center pressure plate operating device for cooperation with the spring-pressed roller.

2. In a clutch operating mechanism the combination of a driving element, a driven element, friction surfaces carried by one of said elements, a plate member movably mounted on one of said members and adapted to be shifted to a position to cause frictional engagement of said elements, a plurality of levers adapted to actuate said plate pivotally mounted on said driving element, said levers each having thrust transmitting means adapted to be engaged with said shiftable plate member and a trackway portion comprising widely divergent leg portions, a movable member provided with a plurality of spring-filled plunger units, a roller carried by each plunger unit adapted to bear against and roll along the trackway portion of one of said levers to effect over-center operation of the levers and cause engagement and disengagement of said driving and driven elements.

3. The combination of rotatable driving and driven members mounted on axially aligned shafts, friction facings carried by one of said members, an axially shiftable pressure plate carried by said driving member and adapted to be shifted to a position to cause frictional engagement of said members, lever means pivotally mounted on said driving member having adjustable stud means mounted thereon adapted to bear against said pressure plate, a trackway carried by said lever means having diverging leg portions positioned with respect to said lever pivot center so as to form an over-center actuating mechanism for said lever means, an axially shiftable sleeve member supporting a radially extending, spring-filled cylinder unit, a plunger member resiliently mounted in said cylinder unit having a roller adapted to bear against and be moved along said trackway, to effect engagement and disengagement of said driving and driven members, said plunger member being so positioned that a centrifugal force effect is applied to said levers to assist in the operation of the levers.

4. In a friction clutch, a flywheel assembly, a driven clutch disc having friction facings, a pressure plate adapted to be shifted into and out of drive transmitting engagement with said driven disc, a shift lever pivotally mounted on said flywheel assembly, an adjustable stud threadedly mounted in said lever adapted to connect said lever and said pressure plate, a trackway having diverging, slightly inclined portions carried by said lever, a shiftable sleeve member, a resiliently supported plunger carried by said sleeve member, a roller mounted on said plunger adapted to bear against and roll along said lever trackway to rock said lever about its pivot center so as to provide for over-center operation of said lever, movement of said roller along said trackway applying a direct force to said resiliently supported plunger to facilitate operation of the clutch.

5. In a clutch, an intermediate disc having friction facings on opposite sides thereof a relatively fixed and a shiftable friction member arranged respectively on opposite sides of said disc adapted to be engaged with said disc, lever means pivotally mounted on said fixed member adapted to actuate said shiftable member to cause engagement and disengagement of said disc and said members, said lever means including a trackway portion having divergent legs positioned with respect to said lever means pivot center so as to form an over-center operating mechanism, a movable lever means operator comprising a spring-loaded plunger and a plunger supported roller adapted to bear against and roll along said trackway to operate said lever means, and spring means adapted to hold said disc and said members in disengaged position.

6. In a clutch, a rotatable intermediate disc, coaxial, rotatable, axially fixed and axially shiftable friction members arranged respectively on opposite sides of said disc adapted to be engaged with said disc, axially extending lever means pivotally mounted on said fixed member adapted to actuate said shiftable member, said lever means including a trackway portion having divergent sections positioned with respect to the lever means pivot center so as to constitute an over-center operating mechanism, an axially shiftable sleeve member carrying a radially extending, spring-loaded plunger, having a roller adapted to ride along said trackway to operate said lever means, said axially extending plunger providing a centrifugal force effect that cooperates with the lever means to retain said disc and said members in engaged and disengaged condition.

7. In a clutch operating mechanism, the combination with a rotatable member having an axially shiftable plate member mounted thereon and a coaxially arranged shaft, of radially extending plate member operating levers pivotally mounted on the rotatable member so that oscillation thereof will effect axial shift of said plate member, said levers each including an axially extending trackway arranged with respect to the associated lever pivot center so as to provide an over-center arrangement, a sleeve axially movable on said shaft, radially extending spring elements mounted on said sleeve, follower means carried by said spring elements each of which is engageable with a trackway on one of said levers and movable therealong to effect oscillation of said levers and shift of said plate member.

8. In a clutch actuating mechanism, the combination with a rotatable cover plate and a clutch actuating lever pivotally mounted on said cover plate and provided with a trackway having a pair of divergent arms, of a shiftable member adapted to reciprocate in substantially coaxial relation to the cover plate, said shiftable member mounting a spring pressed roller arranged to engage said trackway and to be movable therealong to effect operation of said lever, the arrangement of said spring pressed roller with respect to the axis of rotation of said rotatable member providing for the utilization of centrifugal force to assist in the operation of said lever.

9. Actuating mechanism for a friction clutch comprising a rotatable flywheel assembly, a coaxially arranged rotatable clutch disc, and an axially shiftable pressure plate carried by said flywheel assembly adapted to be frictionally engaged with said clutch disc, said actuating mechanism comprising radially extending lever means pivotally mounted on said flywheel assembly and arranged to effect axial movement of said pressure plate upon oscillation of the lever means about the pivot center thereof, said lever means including an axially extending trackway having diverging leg portions arranged with respect to the pivot center of the lever means such that the point of intersection of the leg portions is radially aligned with the lever pivot center, a shiftable sleeve member adapted to reciprocate in substantially coaxial relation to said flywheel assembly, radially extending spring means mounted on said sleeve member and roller means supported by the spring means and arranged to ride along the trackway of the lever means to effect oscillation thereof.

10. In a friction clutch or the like, a rotatable driving member, a rotatable driven member adapted to be frictionally engaged with said driving member for the transmission of drive, a pressure plate movably mounted on said driving member and arranged such that actuation thereof makes and breaks the frictional engagement of said driving and driven members, over-center lever means pivotally mounted on said driving member adapted to be oscillated to actuate said pressure plate, said lever means including a trackway and a pressure plate engaging portion, an axially shiftable operator for said lever means including a radially mounted spring-loaded plunger unit having a roller adapted to ride along said lever means trackway to effect engagement and disengagement of said driving and driven members and arranged to apply a centrifugal force effect to assist the spring-loading of the plunger unit.

ROBERT W. HALBERG.

REFERENCES CITED

The following references are of record in the file of this patent:

UNITED STATES PATENTS

| Number | Name | Date |
|--------|------|------|
| 793,919 | Clarke | July 4, 1905 |
| 2,123,315 | Rossman | July 12, 1938 |
| 2,241,223 | Spase et al. | May 6, 1941 |
| 2,280,357 | Spase | Apr. 21, 1942 |
| 2,406,414 | Thelander et al. | Aug. 27, 1946 |